(12) United States Patent
Tsuruno et al.

(10) Patent No.: US 8,283,050 B2
(45) Date of Patent: Oct. 9, 2012

(54) ALUMINUM ALLOY MATERIAL AND ALUMINUM ALLOY BRAZING SHEET

(75) Inventors: Akihiro Tsuruno, Moka (JP); Katsuhiro Matsukado, Moka (JP); Yoshinori Kato, Moka (JP)

(73) Assignees: Kobe Steel, Ltd., Kobe-shi (JP); T.Rad Co., Ltd., Tokyo (JP)

( * ) Notice: Subject to any disclaimer, the term of this patent is extended or adjusted under 35 U.S.C. 154(b) by 0 days.

(21) Appl. No.: 12/552,677

(22) Filed: Sep. 2, 2009

(65) Prior Publication Data

US 2009/0324985 A1 Dec. 31, 2009

Related U.S. Application Data

(63) Continuation of application No. PCT/JP2008/053411, filed on Feb. 27, 2008.

(30) Foreign Application Priority Data

Mar. 20, 2007 (JP) ................. 2007-072282

(51) Int. Cl.
*B32B 15/20* (2006.01)
*C22C 21/12* (2006.01)
(52) U.S. Cl. ...................... 428/654; 420/529
(58) Field of Classification Search ............... None
See application file for complete search history.

(56) References Cited

U.S. PATENT DOCUMENTS

| | | | |
|---|---|---|---|
| 5,744,255 A | 4/1998 | Doko et al. | |
| 2005/0064226 A1* | 3/2005 | Benedictus et al. | 428/654 |

FOREIGN PATENT DOCUMENTS

| | | |
|---|---|---|
| CN | 1826220 | 8/2006 |
| JP | 60-251246 | 12/1985 |
| JP | 02-073942 | 3/1990 |
| JP | 04-202735 | 7/1992 |
| JP | 04-263036 | 9/1992 |
| JP | 05-339666 | 12/1993 |
| JP | 06-262719 | 9/1994 |
| JP | 07-088677 | 4/1995 |
| JP | 07-090442 | 4/1995 |
| JP | 08-120389 | * 5/1996 |
| JP | 08-291353 | 11/1996 |
| JP | 09-316577 | * 12/1997 |
| JP | 11-199957 | * 7/1999 |
| JP | 11-199958 | * 7/1999 |

OTHER PUBLICATIONS

JP 06-262719 computer translation in English. Sep. 1994.*
Kikuro Toyose, et al. "Corrosion Properties of Aluminum for Brazing Automobile Heat Exchangers", Kobe Steel Engineering Reports, vol. 38 No. 4, 1988. 10, p. 19-22.
Supplementary European Search Report dated Jun. 9, 2011.

* cited by examiner

*Primary Examiner* — John J Zimmerman
(74) *Attorney, Agent, or Firm* — Oblon, Spivak, McClelland, Maier & Neustadt, L.L.P.

(57) ABSTRACT

The present invention provides an aluminum alloy material which is used as a core material for an aluminum alloy brazing sheet and has superior strength at a high temperature. The aluminum alloy material of the present invention is used as a core material C1 for an aluminum alloy brazing sheet B31 (or B32) which has a filler alloy F formed on at least one side of the core material C1. The aluminum alloy material contains more than 2.5% by mass and 3.5% by mass or less of Cu, and the balance being made of aluminum and unavoidable impurities.

6 Claims, 1 Drawing Sheet

ALUMINUM ALLOY MATERIAL AND ALUMINUM ALLOY BRAZING SHEET

This is a continuous application of International Application No. PCT/JP2008/053411, filed Feb. 27, 2008.

TECHNICAL FIELD

The present invention relates to an aluminum alloy material used as a core material for an aluminum alloy brazing sheet, and an aluminum alloy brazing sheet.

BACKGROUND ART

Generally, for example, a condenser, an evaporator and an intercooler as a heat exchanger for motor vehicles are manufactured by brazing a tube material or a plate material having a shape including a fluid passage, and a corrugated fin material, with the materials alternately superposed and combined. The tube material, the plate material and the fin material are formed from a brazing aluminum alloy material or an aluminum alloy brazing sheet which is fabricated by cladding an Al—Si-based filler alloy or the like on one side or both sides of a core material made of an aluminum alloy.

Al—Mn-based alloys have been predominantly used for a conventional brazing aluminum alloy material and a conventional core material for an aluminum alloy brazing sheet. In order to enhance the strength of the aluminum alloy, a brazing aluminum alloy material with Cu, and Si or Mg added, and an aluminum alloy brazing sheet fabricated by cladding an Al—Si-based filler alloy on a core material using the brazing aluminum alloy material have been proposed (For example, see Patent Documents 1 to 3).

Patent Document 1: Japanese Patent Application Laid-Open No. 8-291353 (Paragraphs 0010 to 0015 and 0025)
Patent Document 2: Japanese Patent Application Laid-Open No. 5-339666 (Paragraphs 0005 to 0013)
Patent Document 3: Japanese Patent Application Laid-Open No. 4-202735 (page 2, upper-right column, line 12 to page 2, lower-left column, line 17)

DISCLOSURE OF THE INVENTION

Problems to be Solved by the Invention

However, the operating temperature of the heat exchanger manufactured from the brazing aluminum alloy material and the aluminum alloy brazing sheet using the brazing aluminum alloy material as a core material as described above is generally 100° C. or less. Therefore, when the operating temperature is a high temperature, for example, 150° C. or more, the strengths of the aluminum alloy material and the aluminum alloy brazing sheet using the aluminum alloy material as a core material are insufficient, causing a problem that the uses of the aluminum alloy material and the aluminum alloy brazing sheet are limited.

In recent years, the smaller size and higher performance of the heat exchanger have been required, and the operating condition of the heat exchanger has advanced to high pressure and high temperature. High strength at a high temperature of 150° C. or more has been required for the brazing aluminum alloy material and the aluminum alloy brazing sheet using the brazing aluminum alloy material as a core material.

Then, in order to solve the problem, an object of the present invention is to provide an aluminum alloy material used as a core material for an aluminum alloy brazing sheet and having excellent strength at a high temperature, and an aluminum alloy brazing sheet using a core material having excellent strength at a high temperature.

Means for Solving the Problems

In order to achieve the object, the aluminum alloy material according to the present invention is an aluminum alloy material used as a core material for an aluminum alloy brazing sheet having a filler alloy formed on at least one side of the core material, wherein the aluminum alloy material includes more than 2.5% by mass and 3.5% by mass or less of Cu, and the balance is made of aluminum and unavoidable impurities.

In the aluminum alloy material, since the content of Cu is defined in a range of more than 2.5% by mass and 3.5% by mass or less, the strength of an aluminum alloy caused by solid solution-precipitation strengthening of Cu can be enhanced and the strength reduction of the aluminum alloy at a high temperature can be decreased.

The aluminum alloy material according to the present invention further includes at least one kind of 0.05 to 1.0% by mass of Si, 0.05 to 1.5% by mass of Fe, 0.05 to 1.5% by mass of Mn, 0.05 to 0.6% by mass of Mg, 0.05 to 1.5% by mass of Ni, 0.05 to 0.3% by mass of Cr, 0.05 to 0.3% by mass of Ti, 0.05 to 0.3% by mass of Zr, 0.05 to 0.3% by mass of V, 0.01 to 0.1% by mass of Sn, 0.01 to 0.1% by mass of Cd, and 0.01 to 0.1% by mass of In.

Since the aluminum alloy material further contains at least one kind of Si, Fe, Mn, Mg, Ni, Cr, Ti, Zr, V, Sn, Cd and In and the content thereof is appropriately defined, the strength and forming processability of the aluminum alloy can be enhanced.

In order to achieve the object, the aluminum alloy brazing sheet according to the present invention has the aluminum alloy material used as a core material, and the core material has one side or both sides on which a filler alloy made of an aluminum alloy is formed.

In the aluminum alloy brazing sheet, since the aluminum alloy material is used as a core material, the strength reduction at a high temperature can be decreased, and the forming processability can be enhanced. Since, the filler alloy is provided on one side or both sides of the core material, the aluminum alloy brazing sheet can be easily processed into the heat exchanger or the like by brazing.

The aluminum alloy brazing sheet according to the present invention has the aluminum alloy material used as a core material, and the core material has one side on which a filler alloy made of an aluminum alloy is formed and the other side on which a sacrificial alloy made of aluminum or an aluminum alloy is formed.

In the aluminum alloy brazing sheet, since the aluminum alloy material is used as a core material, the strength reduction can be decreased at a high temperature, and the forming processability can be enhanced. Since the filler alloy is provided on one side of the core material, the aluminum alloy brazing sheet can be easily processed into the heat exchanger or the like by brazing. Since the sacrificial alloy is provided on the other side of the core material, the corrosion resistance thereof can be enhanced by the sacrificial effect of the sacrificial alloy.

EFFECT OF THE INVENTION

According to the present invention, since the content of Cu is appropriately defined in the aluminum alloy material, the strength of the aluminum alloy can be enhanced and the strength reduction at a high temperature can be decreased. Thus, the aluminum alloy material has excellent strength at a high temperature. Since the aluminum alloy material further contains at least one kind of Si, Fe, Mn, Mg, Ni, Cr, Ti, Zr, V, Sn, Cd and In, and the content thereof is appropriately defined, the aluminum alloy material has excellent strength and forming processability.

Since the aluminum alloy brazing sheet according to the present invention uses the aluminum alloy material having the appropriately defined content of Cu as a core material, the aluminum alloy brazing sheet has excellent strength at a high temperature and forming processability. Since the filler alloy is provided on at least one side of the core material, the aluminum alloy brazing sheet can be easily processed into the heat exchanger or the like by brazing. The sacrificial alloy can be provided to enhance the corrosion resistance thereof.

EXPLANATION OF REFERENCE NUMERALS

Figure 1:
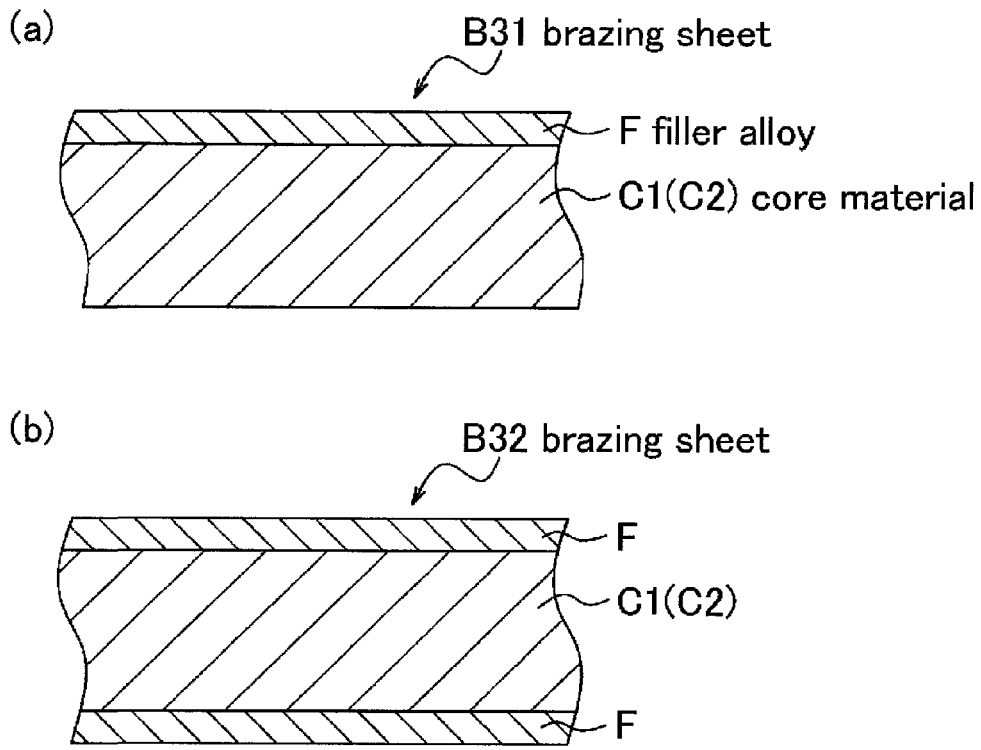
FIG. 1(a) is a sectional view showing an aluminum alloy brazing sheet having a filler alloy formed on one side of a core material.
FIG. 1(b) is a sectional view showing an aluminum alloy brazing sheet having a filler alloy formed on both sides of a core material.

B31, B32 and B4: brazing sheet
C1, C2: core material (aluminum alloy material)
F: filler alloy
S: sacrificial alloy

BEST MODE FOR CARRYING OUT THE INVENTION

Hereinafter, one embodiment of the present invention will be described.

[Aluminum Alloy Material]

An aluminum alloy material according to a first embodiment of the present invention is used as a core material of an aluminum alloy brazing sheet. The aluminum alloy material contains more than 2.5% by mass and 3.5% by mass or less of Cu, and the balance being made of aluminum and unavoidable impurities.

An aluminum alloy material according to a second embodiment of the present invention is used as a core material of an aluminum alloy brazing sheet. The aluminum alloy material contains more than 2.5% by mass and 3.5% by mass or less of Cu, and further contains at least one kind of 0.05 to 1.0% by mass of Si, 0.05 to 1.5% by mass of Fe, 0.05 to 1.5% by mass of Mn, 0.05 to 0.6% by mass of Mg, 0.05 to 1.5% by mass of Ni, 0.05 to 0.3% by mass of Cr, 0.05 to 0.3% by mass of Ti, 0.05 to 0.3% by mass of Zr, 0.05 to 0.3% by mass of V, 0.01 to 0.1% by mass of Sn, 0.01 to 0.1% by mass of Cd, and 0.01 to 0.1% by mass of In, and the balance being made of aluminum and unavoidable impurities.

The aluminum alloy material according to the embodiment of the present invention can also be used as a brazing aluminum alloy material.

Hereinafter, the reason for the numerical limitation of the contents of the added elements of the aluminum alloy material according to the embodiment of the present invention will be described.

<Cu: More than 2.5% by Mass and 3.5% by Mass or Less>

Cu is subjected to solid solution-precipitation strengthening in an aluminum alloy to enhance the strength thereof. The strength reduction of the aluminum alloy material at a high temperature is decreased by adding Cu. Furthermore, since the potential of the core material can be made nobler than that of the filler alloy by adding Cu when the aluminum alloy material is used as a core material for the aluminum alloy brazing sheet, the filler alloy performs the sacrificial corrosion prevention of the core material (aluminum alloy material) to enhance the corrosion resistance of the aluminum alloy brazing sheet.

When the content of Cu is 2.5% by mass or less, sufficient strength at a high temperature is not obtained. On the other hand, since the melting point of the aluminum alloy material is reduced when the content of Cu is more than 3.5% by mass, there is a fear that the aluminum alloy material may melt in brazing. Since the elongation of a material (aluminum alloy material) before brazing is deteriorated with the increase of the content of Cu, the forming processability is reduced. Therefore, the content of Cu of the aluminum alloy material in the first and second embodiments of the present invention is set to more than 2.5% by mass and 3.5% by mass or less.

<Si: 0.05 to 1.0% by Mass>

Si is subjected to solid solution-precipitation strengthening in the aluminum alloy to enhance the strength thereof. When the content of Si is less than 0.05% by mass, a sufficient strength improving effect is not obtained. On the other hand, since the melting point of the aluminum alloy material may be further reduced together with Cu mentioned above when the content of Si is more than 1.0% by mass, there is a fear that the aluminum alloy material may melt in brazing. Therefore, the content of Si in the second embodiment of the present invention is set to 0.05 to 1.0% by mass.

<Fe: 0.05 to 1.5% by Mass>

Fe crystallizes and precipitates as an intermetallic compound in the aluminum alloy to contribute to dispersion strengthening. Since the crystallizing/precipitating intermetallic compound serves as nucleus of recrystallization and accelerates the recrystallization, the intermetallic compound has an effect of fining a grain structure, and enhances the forming processability of the aluminum alloy material. When the content of Fe is less than 0.05% by mass, these effects are not sufficiently obtained. On the other hand, when the content of Fe is more than 1.5% by mass, the crystallization and precipitation of the intermetallic compound may increase to reduce the forming processability of the aluminum alloy material in some cases. Therefore, the content of Fe in the second embodiment of the present invention is set to 0.05 to 1.5% by mass.

<Mn: 0.05 to 1.5% by Mass>

Mn crystallizes and precipitates as an intermetallic compound in the aluminum alloy to contribute to dispersion strengthening. When the content of Mn is less than 0.05% by mass, a dispersion strengthening effect is not sufficiently obtained. On the other hand, since the amount of coarse crystals increases when the content of Mn is more than 1.5% by mass, the forming processability of the aluminum alloy material may be reduced in some cases. Therefore, the content of Mn in the second embodiment of the present invention is set to 0.05 to 1.5% by mass.

<Mg: 0.05 to 0.6% by Mass>

Mg is subjected to solid solution-precipitation strengthening in the aluminum alloy by adding Mg to the aluminum alloy as in Cu, Si and Mn as described above to enhance the strength thereof. Particularly, in simultaneous addition with Si, Mg generates and precipitates an intermetallic compound to contribute to precipitation strengthening. When the content of Mg is less than 0.05% by mass, these effects are not sufficiently obtained. On the other hand, when the content of Mg is more than 0.6% by mass, brazability may be inhibited in brazing under an atmosphere using noncorrosive flux in some cases. The elongation of the material (aluminum alloy material) before brazing may be deteriorated to reduce the forming processability in some cases. Therefore, the content of Mg in the second embodiment of the present invention is set to 0.05 to 0.6% by mass.

<Ni: 0.05 to 1.5% by Mass>

Ni exists as an intermetallic compound in the aluminum alloy to contribute to dispersion strengthening. When the content of Ni is less than 0.05% by mass, the effect of the dispersion strengthening is not sufficiently obtained. On the other hand, when the content of Ni is more than 1.5% by mass, the intermetallic compound increases, and therefore the forming processability of the aluminum alloy material may be reduced in some cases. Therefore, the content of Ni in the second embodiment of the present invention is set to 0.05 to 1.5% by mass.

<Cr: 0.05 to 0.3% by Mass>

Cr generates a fine intermetallic compound in the aluminum alloy to enhance the strength thereof. When the content of Cr is less than 0.05% by mass, the effect of the enhancement of the strength is not sufficiently obtained. On the other hand, when the content of Cr is more than 0.3% by mass, a coarse intermetallic compound is generated, and therefore the forming processability of the aluminum alloy material may be reduced in some cases. Therefore, the content of Cr in the second embodiment of the present invention is set to 0.05 to 0.3% by mass.

<Ti: 0.05 to 0.3% by Mass>

Ti generates a fine intermetallic compound in the aluminum alloy to enhance the strength thereof. When the content of Ti is less than 0.05% by mass, the effect of the enhancement of the strength is not sufficiently obtained. On the other hand, when the content of Ti is more than 0.3% by mass, a coarse intermetallic compound is generated, and therefore the forming processability of the aluminum alloy material may be reduced in some cases. Therefore, the content of Ti in the second embodiment of the present invention is set to 0.05 to 0.3% by mass.

<Zr: 0.05 to 0.3% by Mass>

Zr generates a fine intermetallic compound in the aluminum alloy to enhance the strength thereof. When the content of Zr is less than 0.05% by mass, the effect of the enhancement of the strength is not sufficiently obtained. On the other hand, when the content of Zr is more than 0.3% by mass, a coarse intermetallic compound is generated, and therefore the forming processability of the aluminum alloy material may be reduced in some cases. Therefore, the content of Zr in the second embodiment of the present invention is set to 0.05 to 0.3% by mass.

<V: 0.05 to 0.3% by Mass>

V generates a fine intermetallic compound in the aluminum alloy to enhance the strength thereof. When the content of V is less than 0.05% by mass, the effect of the enhancement of the strength is not sufficiently obtained. On the other hand, when the content of V is more than 0.3% by mass, a coarse intermetallic compound is generated, and therefore the forming processability of the aluminum alloy material may be reduced in some cases. Therefore, the content of V in the second embodiment of the present invention is set to 0.05 to 0.3% by mass.

<Sn: 0.01 to 0.1% by Mass>

Sn accelerates the precipitation of Cu at a high temperature in the aluminum alloy to contribute to the enhancement of the strength. When the content of Sn is less than 0.01% by mass, the effect thereof is not sufficiently obtained. On the other hand, when the content of Sn is more than 0.1% by mass, the effect thereof will be saturated. That is, the effect is not changed as in a case where the content of Sn is set to 0.1% by mass, thereby resulting in cost rise. Therefore, the content of Sn in the second embodiment of the present invention is set to 0.01 to 0.1% by mass.

<Cd: 0.01 to 0.1% by Mass>

Cd accelerates the precipitation of Cu at a high temperature in the aluminum alloy as in Sn to contribute to the enhancement of the strength. When the content of Cd is less than 0.01% by mass, the effect thereof is not sufficiently obtained. On the other hand, when the content of Cd is more than 0.1% by mass, the effect thereof is saturated, thereby resulting in cost rise. Therefore, the content of Cd in the second embodiment of the present invention is set to 0.01 to 0.1% by mass.

<In: 0.01 to 0.1% by Mass>

In accelerates the precipitation of Cu at a high temperature in the aluminum alloy as in Sn and Cd to contribute to the enhancement of the strength. When the content of In is less than 0.01% by mass, the effect thereof is not sufficiently obtained. On the other hand, when the content of In is more than 0.1% by mass, the effect thereof is saturated, thereby resulting in cost rise. Therefore, the content of In in the second embodiment of the present invention is set to 0.01 to 0.1% by mass.

<Unavoidable Impurities>

The aluminum alloy material according to the embodiment of the present invention may contain Si, Fe, Mn, Mg, Ni, Cr, Ti, Zr, V, Sn, Cd and In as unavoidable impurities in the content of less than the lower limit value of each of the above-mentioned contents, the unavoidable impurities being the added elements of the aluminum alloy material according to the second embodiment of the present invention. Even when the contents of the added elements are set to less than the lower limit value of each of the contents, the performance of the aluminum alloy material according to the embodiment of the present invention is not hindered at all. In order to obtain the above effects of the added elements, it is necessary to particularly contain the contents defined in the present invention.

[Aluminum Alloy Brazing Sheet]

Figure 2:
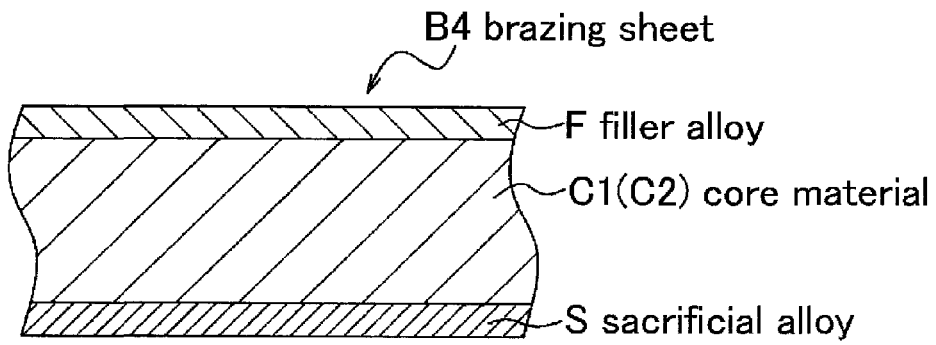
FIG. 2 is a sectional view showing an aluminum alloy brazing sheet having a filler alloy formed on one side of a core material and a sacrificial alloy formed on the other side.

Next, an aluminum alloy brazing sheet (herein after, referred to as a brazing sheet) using the above-mentioned aluminum alloy material according to the embodiment of the present invention as a core material will be suitably described with reference to the drawings. FIG. 1(a) is a sectional view showing a brazing sheet having a filler alloy formed on one side of a core material. FIG. 1(b) is a sectional view showing a brazing sheet having a filler alloy formed on both sides of the core material. FIG. 2 is a sectional view showing a brazing sheet having a filler alloy formed on one side of a core material and a sacrificial alloy formed on the other side.

As shown in FIG. 1(a), a brazing sheet B31 has a filler alloy F made of an aluminum alloy and formed on one side of a core material C1 of the aluminum alloy material according to the above first embodiment (or a core material C2 of the aluminum alloy material according to the second embodiment).

As shown in FIG. 1(b), a brazing sheet B32 has the filler alloys F and F made of an aluminum alloy and formed on both sides of the core material C1 (or the core material C2).

Furthermore, as shown in FIG. 2, a brazing sheet B4 has the filler alloy F made of the aluminum alloy and formed on one side of the core material C1 (or the core material C2). The brazing sheet B4 has a sacrificial alloy S made of aluminum or the aluminum alloy and formed on the other side.

<Core Material>

The core material C1 for the brazing sheets B31, B32 and B4 is the aluminum alloy material according to the above first embodiment. The core material C2 is the aluminum alloy material according to the above second embodiment. The contents of the added elements of the core materials C1, C2 and the reason for the numerical limitation of the contents have been described above, and the description thereof is omitted.

<Filler Alloy>

As the filler alloy F for the brazing sheets B31, B32 and B4, known filler alloys made of the aluminum alloy can be used. Examples of the aluminum alloys include such as an Al—Si-based alloy, an Al—Si—Zn-based alloy and an Al—Si—Mg (Bi)-based alloy.

<Sacrificial Alloy>

As the sacrificial alloy S of the brazing sheet B4 (hereinafter, referred to as a sacrificial material), known sacrificial materials made of aluminum or an aluminum alloy can be used. Examples of the aluminum alloys include such as an Al—Zn-based alloy, an Al—Zn—Mg-based alloy and alloys containing Mn and Si or the like.

Herein, one example of methods for manufacturing the brazing sheet according to the embodiment of the present invention will be briefly described.

First, an aluminum alloy for core materials (aluminum alloy material), an aluminum alloy for filler alloys, and an aluminum alloy for sacrificial materials are respectively dissolved, cast, and subjected to scalping and homogenized heat treatment if needed to obtain ingots for core materials, ingots for filler alloys and ingots for sacrificial materials. The ingots for filler alloys and the ingots for sacrificial materials are respectively hot-rolled or cut into a predetermined thickness to obtain aluminum alloy plates for filler alloys and aluminum alloy plates for sacrificial materials. If needed, the ingots for core materials may also be hot-rolled or cut into a predetermined thickness to form aluminum alloy plates for core materials.

Next, the obtained ingots for core materials (or aluminum alloy plates for core materials), the aluminum alloy plates for filler alloys and the aluminum alloy plates for sacrificial materials are superposed so as to have a predetermined cladding ratio, and are bonded under pressure by hot-rolling after being heated at a temperature of 400° C. or more to be formed into a plate shape. Then, the ingots and the plates are formed into a predetermined plate thickness by rough-annealing, cold-rolling, process-annealing, cold-rolling and finishing-annealing if needed. Thus, the brazing sheet according to the embodiment of the present invention can be manufactured.

Herein, in the process for superposing the ingot for core materials (or the aluminum alloy plate for core materials), the aluminum alloy plate for filler alloys and the aluminum alloy plate for sacrificial materials, an aluminum alloy plate for filler alloys and an ingot for core materials (or aluminum alloy plate for core materials) are superposed, and the brazing sheet B31 shown in FIG. 1(a) can be manufactured by passing through the subsequent processes (rough-annealing, cold-rolling, process-annealing, cold-rolling and finish-annealing or the like).

The ingot for core materials (or the aluminum alloy plate for core materials) is superposed so as to be sandwiched between two aluminum alloy plates for filler alloys, and the brazing sheet B32 shown in FIG. 1(b) can be manufactured by passing through the subsequent processes.

The ingot for core materials (or aluminum alloy plate for core materials) is superposed so as to be sandwiched between the aluminum alloy plate for filler alloys and the aluminum alloy plate for sacrificial materials, and the brazing sheet B4 shown in FIG. 2 can be manufactured by passing through the subsequent processes.

After the aluminum alloy material (brazing aluminum alloy material) according to the embodiment of the present invention can be manufactured by hot-rolling the above ingot for core materials into a predetermined thickness, and by subjecting the ingot for core materials to rough-annealing, cold-rolling, process-annealing, cold-rolling and finish-annealing if needed to be formed into a predetermined plate thickness.

The manufacturing method, which is one example for manufacturing the brazing sheet (or the aluminum alloy material) according to the embodiment of the present invention, is not necessarily limited to the manufacturing method.

As described above, since the strength of the aluminum alloy can be enhanced and the strength reduction at a high temperature can be decreased by appropriately defining the content of Cu, the aluminum alloy materials according to the first and second embodiments has excellent strength at a high temperature. The aluminum alloy material according to the second embodiment further contains at least one kind of Si, Fe, Mn, Mg, Ni, Cr, Ti, Zr, V, Sn, Cd and In, and the contents thereof are appropriately defined, and whereby, the aluminum alloy material has excellent strength and forming processability.

The brazing sheets B31, B32 and B4, which have the core material C1 (or C2) of the aluminum alloy material according to the first embodiment (or the second embodiment), have excellent strength at a high temperature and forming processability. The filler alloy F is formed on at least one side of the core material C1 (or C2), and whereby the brazing sheets B31, B32 and B4 can be easily processed into the heat exchanger or the like by brazing. Furthermore, the sacrificial alloy S is formed as in the brazing sheet B4, and whereby the corrosion resistance thereof can be enhanced.

The brazing sheets B31, B32 and B4 (and the brazing aluminum alloy material) can be suitably used as a plate material and tube material or the like of the heat exchanger for motor vehicles manufactured by brazing. According to the above description, a heat exchanger having sufficient strength can be manufactured at a high temperature, particularly, of 150° C. or higher.

EXAMPLES

Hereinafter, a brazing sheet using the aluminum alloy material according to the present invention as a core material will be specifically described by comparing examples satisfying the ranges of the contents of the added elements defined in the present invention with comparative examples not satisfying the ranges of the contents of the added elements defined in the present invention.

Brazing sheets of examples and comparative examples were produced as follows.

First, an aluminum alloy for core materials, an aluminum alloy for filler alloys (containing Si: 10% by mass, and Fe: 0.2% by mass), and an aluminum alloy for sacrificial materials (containing Si: 0.19% by mass, Fe: 0.2% by mass, Mn: 0.1% by mass and Zn: 2.0% by mass) having composition shown in Table 1 were used. Each of the alloys was dissolved and cast, and was then subjected to homogenized heat treatment and hot-rolling to obtain an aluminum alloy plate for core materials, an aluminum alloy plate for filler alloys and an aluminum alloy plate for sacrificial materials.

TABLE 1

| | | Added elements (% by mass) | | | | | | | | | | | | |
|---|---|---|---|---|---|---|---|---|---|---|---|---|---|---|
| | | Cu | Si | Fe | Mn | Mg | Ni | Cr | Ti | Zr | V | Sn | Cd | In | Zn |
| Core material | C101 | 2.6 | — | — | — | — | — | — | — | — | — | — | — | — | — |
| | C102 | 3.0 | — | — | — | — | — | — | — | — | — | — | — | — | — |
| | C103 | 3.5 | — | — | — | — | — | — | — | — | — | — | — | — | — |
| | C104 | 2.0 | — | — | — | — | — | — | — | — | — | — | — | — | — |
| | C105 | 4.0 | — | — | — | — | — | — | — | — | — | — | — | — | — |
| | C201 | 2.7 | 0.5 | — | — | — | — | — | — | — | — | — | — | — | — |
| | C202 | 2.7 | — | 1.0 | — | — | — | — | — | — | — | — | — | — | — |
| | C203 | 2.7 | — | — | 1.0 | — | — | — | — | — | — | — | — | — | — |
| | C204 | 2.7 | — | — | — | 0.3 | — | — | — | — | — | — | — | — | — |
| | C205 | 2.7 | — | — | — | — | 1.0 | — | — | — | — | — | — | — | — |
| | C206 | 2.7 | — | — | — | — | — | 0.15 | — | — | — | — | — | — | — |
| | C207 | 2.7 | — | — | — | — | — | — | 0.15 | — | — | — | — | — | — |
| | C208 | 2.7 | — | — | — | — | — | — | — | 0.15 | — | — | — | — | — |
| | C209 | 2.7 | — | — | — | — | — | — | — | — | 0.15 | — | — | — | — |
| | C210 | 2.7 | — | — | — | — | — | — | — | — | — | 0.05 | — | — | — |
| | C211 | 2.7 | — | — | — | — | — | — | — | — | — | — | 0.05 | — | — |
| | C212 | 2.7 | — | — | — | — | — | — | — | — | — | — | — | 0.05 | — |
| | C213 | 2.7 | 0.07 | — | — | — | — | — | 0.07 | — | — | — | — | — | — |
| | C214 | 2.7 | — | 0.07 | — | — | — | — | — | 0.07 | — | — | — | — | — |
| | C215 | 2.7 | — | — | 0.07 | — | — | — | — | — | 0.07 | — | — | — | — |
| | C216 | 2.7 | — | — | — | 0.07 | — | — | — | — | — | 0.02 | — | — | — |
| | C217 | 2.7 | — | — | — | — | 0.07 | — | — | — | — | — | 0.02 | — | — |
| | C218 | 2.7 | — | — | — | — | — | 0.07 | — | — | — | — | — | 0.02 | — |
| | C219 | 2.7 | 0.9 | — | — | — | — | — | — | — | — | — | — | 0.08 | — |
| | C220 | 2.7 | — | 1.4 | — | — | — | — | — | — | — | — | 0.09 | — | — |
| | C221 | 2.7 | — | — | 1.4 | — | — | — | — | — | — | 0.08 | — | — | — |
| | C222 | 2.7 | — | — | — | 0.5 | — | — | — | — | 0.2 | — | — | — | — |
| | C223 | 2.7 | — | — | — | — | 1.3 | — | — | 0.3 | — | — | — | — | — |
| | C224 | 2.7 | — | — | — | — | — | 0.2 | 0.2 | — | — | — | — | — | — |
| | C225 | 2.7 | 0.7 | — | — | 0.4 | — | — | 0.1 | — | — | 0.08 | — | — | — |
| | C226 | 2.7 | — | 1.2 | — | — | 0.5 | — | — | 0.1 | — | — | 0.07 | — | — |
| | C227 | 2.7 | — | — | 0.8 | — | — | 0.1 | — | — | 0.1 | — | — | 0.02 | — |
| | C228 | 2.7 | 0.3 | 0.5 | 0.3 | 0.2 | 0.5 | 0.1 | 0.1 | 0.1 | 0.1 | 0.07 | 0.06 | 0.02 | — |
| | C229 | 2.7 | 1.5 | — | — | — | — | — | — | — | — | — | — | — | — |
| | C230 | 2.7 | — | 2.0 | — | — | — | — | — | — | — | — | — | — | — |
| | C231 | 2.7 | — | — | 1.9 | — | — | — | — | — | — | — | — | — | — |
| | C232 | 2.7 | — | — | — | 0.9 | — | — | — | — | — | — | — | — | — |
| | C233 | 2.7 | — | — | — | — | 2.0 | — | — | — | — | — | — | — | — |
| | C234 | 2.7 | — | — | — | — | — | 0.6 | — | — | — | — | — | — | — |
| | C235 | 2.7 | — | — | — | — | — | — | 0.6 | — | — | — | — | — | — |
| | C236 | 2.7 | — | — | — | — | — | — | — | 0.6 | — | — | — | — | — |
| | C237 | 2.7 | — | — | — | — | — | — | — | — | 0.6 | — | — | — | — |
| | C238 | 2.7 | — | — | — | — | — | — | — | — | — | 0.2 | — | — | — |
| | C239 | 2.7 | — | — | — | — | — | — | — | — | — | — | 0.2 | — | — |
| | C240 | 2.7 | — | — | — | — | — | — | — | — | — | — | — | 0.2 | — |
| Filler alloy | F | — | 10 | 0.2 | — | — | — | — | — | — | — | — | — | — | — |
| Sacrificial material | S | — | 0.1 | 0.2 | 0.1 | — | — | — | — | — | — | — | — | — | 2.0 |

Next, the aluminum alloy plates for filler alloys were respectively set on both the sides of the aluminum alloy plate for core materials so as to be set to 10% of the whole plate thickness. The aluminum alloy plate for filler alloys was set on one side of the aluminum alloy plate for core materials so as to be set to 10% of the whole plate thickness, and the aluminum alloy plate for sacrificial materials was set on the other side so as to be set to 10% of the whole plate thickness. The plates were subjected to hot-rolling, cold-rolling and annealing to produce brazing sheets (Examples 1 to 4, and Comparative Examples 5 and 6) shown in Table 2 and brazing sheets (Examples 7 to 36, and Comparative Examples 37 to 48) shown in Table 3. The brazing sheets (examples and comparative examples), which have a plate thickness of 1.6 mm, are tempered to an O material.

TABLE 2

| | | Core material | Filler alloy 1 | Filler alloy 2 | Sacrificial material | Strength at a high temperature (MPa) | Material elongation (%) |
|---|---|---|---|---|---|---|---|
| Examples | 1 | C101 | F | F | — | 148 | 33 |
| | 2 | C102 | F | F | — | 160 | 31 |
| | 3 | C103 | F | F | — | 170 | 29 |
| | 4 | C102 | F | — | S | 155 | 33 |

TABLE 2-continued

|  |  | Core material | Filler alloy 1 | Filler alloy 2 | Sacrificial material | Strength at a high temperature (MPa) | Material elongation (%) |
|---|---|---|---|---|---|---|---|
| Comparative Examples | 5 | C104 | F | F | — | 120 | 34 |
|  | 6 | C105 | F | F | — | — | 26 |

Herein, in each of Examples 1 to 4, the content of Cu contained in the core material satisfies the range defined in the present invention (claim 1). In Comparative Example 5, the content of Cu contained in the core material is not more than the lower limit value of the range defined in the present invention. In Comparative Example 6, the content of Cu contained in the core material is more than the upper limit of the range defined in the present invention.

Examples 1 to 3 and Comparative Examples 5 and 6 are brazing sheets having filler alloys F and F formed on both the sides of the core material C1 as shown in FIG. 1(b). Example 4 is a brazing sheet having the filler alloy F formed on one side of the core material C1 and a sacrificial alloy S (sacrificial material) formed on the other side as shown in FIG. 2.

Herein, in each of Examples 7 to 36, the contents of Cu contained in the core material and other added elements (at least one kind of Si, Fe, Mn, Mg, Ni, Cr, Ti, Zr, V, Sn, Cd and In) satisfy all the range defined in the present invention (claim 2).

In Comparative Example 37, the content of Si contained in the core material is more than the upper limit value of the range defined in the present invention. In Comparative Example 38, the content of Fe contained in the core material is more than the upper limit value of the range defined in the present invention. In Comparative Example 39, the content of Mn contained in the core material is more than the upper limit value of the range defined in the present invention. In Comparative Example 40, the content of Mg contained in the core

TABLE 3

|  |  | Core material | Filler alloy 1 | Filler alloy 2 | Sacrificial material | Strength at a high temperature (MPa) | Material elongation (%) |
|---|---|---|---|---|---|---|---|
| Examples | 7 | C201 | F | F | — | 155 | 33 |
|  | 8 | C202 | F | F | — | 155 | 34 |
|  | 9 | C203 | F | F | — | 155 | 28 |
|  | 10 | C204 | F | F | — | 160 | 28 |
|  | 11 | C205 | F | F | — | 155 | 28 |
|  | 12 | C206 | F | F | — | 153 | 30 |
|  | 13 | C207 | F | F | — | 153 | 30 |
|  | 14 | C208 | F | F | — | 153 | 31 |
|  | 15 | C209 | F | F | — | 153 | 31 |
|  | 16 | C210 | F | F | — | 155 | 32 |
|  | 17 | C211 | F | F | — | 155 | 32 |
|  | 18 | C212 | F | F | — | 154 | 32 |
|  | 19 | C213 | F | F | — | 153 | 32 |
|  | 20 | C214 | F | F | — | 153 | 32 |
|  | 21 | C215 | F | F | — | 153 | 31 |
|  | 22 | C216 | F | F | — | 156 | 31 |
|  | 23 | C217 | F | F | — | 155 | 32 |
|  | 24 | C218 | F | F | — | 153 | 31 |
|  | 25 | C219 | F | F | — | 155 | 32 |
|  | 26 | C220 | F | F | — | 158 | 34 |
|  | 27 | C221 | F | F | — | 158 | 28 |
|  | 28 | C222 | F | F | — | 165 | 26 |
|  | 29 | C223 | F | F | — | 157 | 27 |
|  | 30 | C224 | F | F | — | 155 | 28 |
|  | 31 | C225 | F | F | — | 168 | 28 |
|  | 32 | C226 | F | F | — | 160 | 28 |
|  | 33 | C227 | F | F | — | 158 | 27 |
|  | 34 | C228 | F | F | — | 165 | 26 |
|  | 35 | C222 | F | = | S | 160 | 29 |
|  | 36 | C228 | F | = | S | 160 | 28 |
| Comparative Examples | 37 | C229 | F | F | — | — | 32 |
|  | 38 | C230 | F | F | — | 150 | 22 |
|  | 39 | C231 | F | F | — | 150 | 23 |
|  | 40 | C232 | F | F | — | 175 | 21 |
|  | 41 | C233 | F | F | — | 155 | 22 |
|  | 42 | C234 | F | F | — | 155 | 23 |
|  | 43 | C235 | F | F | — | 155 | 23 |
|  | 44 | C236 | F | F | — | 154 | 23 |
|  | 45 | C237 | F | F | — | 155 | 23 |
|  | 46 | C238 | F | F | — | 155 | 31 |
|  | 47 | C239 | F | F | — | 155 | 31 |
|  | 48 | C240 | F | F | — | 155 | 30 | material is more than the upper limit value of the range defined in the present invention.

In Comparative Example 41, the content of Ni contained in the core material is more than the upper limit value of the range defined in the present invention. In Comparative Example 42, the content of Cr contained in the core material is more than the upper limit value of the range defined in the present invention. In Comparative Example 43, the content of Ti contained in the core material is more than the upper limit value of the range defined in the present invention. In Comparative Example 44, the content of Zr contained in the core material is more than the upper limit value of the range defined in the present invention.

In Comparative Example 45, the content of V contained in the core material is more than the upper limit value of the range defined in the present invention. In Comparative Example 46, the content of Sn contained in the core material is more than the upper limit value of the range defined in the present invention. In Comparative Example 47, the content of Cd contained in the core material is more than the upper limit value of the range defined in the present invention. In Comparative Example 48, the content of In contained in the core material is more than the upper limit value of the range defined in the present invention.

Examples 7 to 34 and Comparative Examples 37 to 48 are brazing sheets having the filler alloys F and F formed on both the sides of the core material C2 as shown in FIG. 1(b). Examples 35 and 36 are brazing sheets having the filler alloy F formed on one side of the core material C2 and the sacrificial alloy S (sacrificial material) formed on the other side as shown in FIG. 2.

Even when the aluminum alloy material (core material) according to the present invention contains the other added elements (Si, Fe, Mn, Mg, Ni, Cr, Ti, Zr, V, Sn, Cd, In) of less than the lower limit value of each of the contents thereof as unavoidable impurities as described above, the performance of the present invention is not hindered at all. Therefore, the evaluations of the strength at a high temperature and forming processability to the brazing sheet in which the contents of the other added elements contained in the core material are less than the lower limit value of the range defined in the present invention were not performed.

<Evaluation of Forming Processability>

According to each of examples and each of comparative examples, No. 5 test pieces defined in JIS Z2201 were respectively produced, and material elongation was measured at normal temperature by a tensile test machine. The test pieces having a material elongation of 26% or more were estimated as ones having good forming processability. The results are shown in Tables 2 and 3.

<Evaluation of Strength at High Temperature>

Each of examples and each of comparative examples were cut in a strip shape having a width of 100 mm and a length of 200 mm. On each of examples and each of comparative examples, a commercially available noncorrosive flux (FL-7, Morita Chemical Industries Co., Ltd.) was applied in 5 g/m$^2$. Each of examples and each of comparative examples were dried, and were then hung down so that the longitudinal direction thereof was set to the perpendicular direction. Each of examples and each of comparative examples were subjected to brazing heating in a nitrogen atmosphere at 590° C. for 2 minutes.

From test pieces having a strip shape after brazing heating, No. 5 test pieces defined in JIS Z2201 were respectively produced. The No. 5 test pieces were held at 200° C. for 300 hours, and the tensile strength of the test piece was measured by the tensile test machine at 200° C. The test pieces having strength at a high temperature of 145 MPa or more were estimated as ones having excellent strength at a high temperature. The results are shown in Tables 2 and 3.

<Evaluation Results>

First, as shown in Table 2, Examples 1 to 4 in which the content of Cu contained in the core material satisfies the range defined in the present invention (claim 1) had excellent strength at a high temperature of 145 MPa or more at 200° C. and 200° C. after 300 hours (after elapse of time at a high temperature). The material elongation was 26% or more, and the forming processability was also good.

On the other hand, since the content of Cu contained in the core material was not more than the lower limit value of the range defined in the present invention in Comparative Example 5, Comparative Example 5 had strength at a high temperature of 120 MPa and had insufficient strength at a high temperature as compared with Examples 1 to 4.

Since the content of Cu contained in the core material is more than the upper limit value of the range defined in the present invention in Comparative Example 6, the core material also melted with the filler alloy by brazing heating (590° C., 2 minutes). Normal test pieces were not obtained, and the strength at a high temperature could not be measured. The material elongation of Comparative Example 6 was lower than those of Examples 1 to 4.

Next, as shown in Table 3, Examples 7 to 36 in which the contents of Cu contained in the core material and the other added elements (at least one kind of Si, Fe, Mn, Mg, Ni, Cr, Ti, Zr, V, Sn, Cd and In) satisfy all the ranges defined in the present invention (claim 2), which had the strength at a high temperature of 145 MPa or more at 200° C. and 200° C. after 300 hours (after elapse of time at a high temperature), had excellent strength at a high temperature, and had good forming processability of the material elongation of 26% or more.

On the other hand, since the content of Si contained in the core material is more than the upper limit value of the range defined in the present invention in Comparative Example 37, the core material also melted with the filler alloy by brazing heating (590° C., 2 minutes). Normal test pieces could not be obtained, and the strength at a high temperature could not be measured.

Since the content of each of Fe, Mn, Mg, Ni, Cr, Ti, Zr and V contained in the core material was more than the upper limit value of the range defined in the present invention in each of Comparative Examples 38 to 45, the material elongation of each of Comparative Examples 38 to 45 is as low as 21 to 23% as compared with Examples 7 to 36, and the forming processability thereof was reduced. In Comparative Example 40 in which the content of Mg contained in the core material is more than the upper limit value of the range defined in the present invention, the surface of the filler alloy after brazing heating had blackish brown, and the flow of the filler alloy was uneven.

Furthermore, in each of Comparative Examples 46 to 48, the content of each of Sn, Cd and In contained in the core material was more than the upper limit value of the range defined in the present invention. However, as compared with Examples 16 to 18 in which the content of each of Sn, Cd and In contained in the core material satisfies the range defined in the present invention, both strength at a high temperature and material elongation (forming processability) are not remarkably changed, and the effects obtained by adding Sn, Cd and In were saturated.

As described above, the aluminum alloy material and brazing sheet according to the present invention have been described in detail while showing the embodiments and examples. However, the present invention is not limited to these contents. The specific constitution can be suitably changed within a range where the spirit of the present invention is not deviated.

The invention claimed is:

1. An aluminum alloy brazing sheet having a core material of an aluminum alloy material and a filler alloy formed on at least one side of the core material, the aluminum alloy material of the core material comprising:
   more than 2.5% by mass and 3.5% by mass or less of Cu,
   aluminum,
   less than 0.05% by mass of Mn, and
   unavoidable impurities;
   the filler alloy comprising any one of an Al-Si-based alloy, an Al-Si-Zn-based alloy, an Al-Si-Mg-based alloy and an Al-Si-Mg-Bi-based alloy;
   wherein the aluminum alloy brazing sheet has a tensile strength at 200° C. of 145 MPa or more after brazing heating at 590° C. for 2 minutes followed by holding at 200° C. for 300 hours.

2. The aluminum alloy brazing sheet of claim 1, wherein the aluminum alloy material comprising more than 2.6% by mass and 3.5% by mass or less of Cu.

3. The aluminum alloy brazing sheet of claim 1, wherein the aluminum alloy material comprising more than 3.0% by mass and 3.5% by mass or less of Cu.

4. The aluminum alloy brazing sheet of claim 1, wherein the aluminum alloy material further comprising at least one member selected from the group consisting of:
   0.05 to 1.0% by mass of Si,
   0.05 to 1.5% by mass of Fe,
   0.05 to 0.6% by mass of Mg,
   0.05 to 1.5% by mass of Ni,
   0.05 to 0.3% by mass of Cr,
   0.05 to 0.3% by mass of Ti,
   0.05 to 0.3% by mass of Zr,
   0.05 to 0.3% by mass of V,
   0.01 to 0.1% by mass of Sn,
   0.01 to 0.1% by mass of Cd, and
   0.01 to 0.1% by mass of In.

5. An aluminum alloy brazing sheet of claim 1, wherein the filler alloy is formed on one side or both sides of the core material.

6. An aluminum alloy brazing sheet of claim 1, wherein the filler alloy is formed on one side of the core material and a sacrificial alloy made of aluminum or an aluminum alloy is formed on the other side of the core material.

* * * * *